(12) United States Patent
Nakagawa

(10) Patent No.: US 7,274,633 B2
(45) Date of Patent: Sep. 25, 2007

(54) OPTICAL PICKUP

(75) Inventor: Ryotaro Nakagawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 547 days.

(21) Appl. No.: 10/822,836

(22) Filed: Apr. 13, 2004

(65) Prior Publication Data

US 2004/0218516 A1 Nov. 4, 2004

(30) Foreign Application Priority Data

Apr. 15, 2003 (JP) .................. P2003-110268

(51) Int. Cl.
*G11B 7/00* (2006.01)
(52) U.S. Cl. .................. 369/44.42; 369/120
(58) Field of Classification Search ............. 369/44.11, 369/44.12, 44.14, 44.15, 120, 121, 122, 44.41, 369/44.42
See application file for complete search history.

(56) References Cited

FOREIGN PATENT DOCUMENTS

| JP | 61-140126 U | 8/1986 | | |
|---|---|---|---|---|
| JP | 3-102642 | * | 4/1991 | |
| JP | 3-113725 | * | 5/1991 | ............. 369/44.14 |
| JP | 63-65129 | * | 4/1998 | |
| JP | 2002-342947 A | | 11/2002 | |

* cited by examiner

*Primary Examiner*—Nabil Hindi
(74) *Attorney, Agent, or Firm*—Morgan, Lewis & Bockius LLP

(57) ABSTRACT

An optical pickup in which a plate 2 provided with a photodiode 22 is bonded to an optical bench 1 through an adhesive agent layer 3 in a state in which a minute gap α is maintained between the plate 2 and the optical bench 1. Circular through holes 27 are formed in advance at a plurality of portions of the plate 2. The adhesive agent layer 3 is formed as an adhesive agent injected into the through holes 27 at the plurality of portions is forced out downward through the through holes 27 and is cured in the state of having reached an upper surface 12 of the optical bench 1. The amount of the adhesive agent injected with respect to each of the through holes is controlled so as to be fixed.

5 Claims, 3 Drawing Sheets

OPTICAL PICKUP

BACKGROUND OF THE INVENTION

1. Field of the Invention

The present invention relates to an optical pickup, and more particularly to an optical pickup in which a plate provided with a photodiode is bonded to an optical bench by an adhesive agent.

2. Description of the Related Art

Conventionally, an optical pickup having the structure shown in FIG. 3 has been known (e.g., refer to JP-A-2002-342947). In this optical pickup, an upper surface 12 of an optical bench 1 and edge portions of a plate 2, which is disposed on an upper portion of the optical bench 1 while maintaining a minute gap α between the plate 2 and the upper surface 12 of the optical bench 1, are bonded together through an adhesive agent layer 3. The plate 2 is provided with a photodiode 22 mounted on a flexible printed circuit board (FPC) 21, while the optical bench 1 is provided with a collimator lens 23, an objective lens 24, a semiconductor laser 25, a half mirror 26, and the like. Laser light from the semiconductor laser 25 is projected onto a disk D through the half mirror 26, the collimator lens 23, and as the objective lens 24, and as its reflected light is received by the photodiode 22, the disk D is optically scanned.

In this optical pickup, the operation of bonding the plate 2 to the optical bench through the adhesive agent layer 3 is conventionally carried out by the following procedure. Namely, in this operation, as shown by the phantom lines in FIG. 3, in a state in which the plate 2 is held by a positioning arm 100, the plate 2 is brought close to the optical bench 1 at a predetermined position by using the positioning arm 100. Subsequently, the photodiode 22 is positioned with respect to an optical axis P with high accuracy by effecting such as the positional adjustment of the plate 2 in three-axis directions which are perpendicular to each other. After such highly accurate positioning, an adhesive agent is injected to predetermined portions between the edge portions of the plate 2 and the upper surface 12 of the optical bench 1 and is allowed to cure.

As another conventional example, a fixing base provided with a photodetector is inserted in one hole formed in the optical bench, and the photodetector is positionally adjusted by pushing in or pulling out the fixing base in that hole. Subsequently, as a means of fixing that fixing base to the optical bench, instead of the method in which positioning screws are used a means is adopted wherein an adhesive agent is injected into the hole formed in the fixing base to bond the fixing base to the optical bench (e.g., refer to JP-UM-A-61-140126).

In addition, as shown in FIG. 4, it has been practiced to bond a plurality of peripheral portions of the plate 2 to the upper surface 12 of the optical bench 1 in spots by means of the adhesive agent layer 3, or to form recesses in a plurality of peripheral portions of the plate 2 and inject the adhesive agent into the recesses to form an adhesive agent layer.

However, the conventional example (JP-A-2002-342947) explained with reference to FIG. 3 has encountered the following problem. Namely, in this conventional example, the adhesive agent layer 3 is formed by allowing the adhesive agent injected between edge portions o the plate 2 and the upper surface 12 of the optical bench 1 to cure. For this reason, even if the amount of the adhesive agent injected is controlled so as to be fixed, the range of the spread of the adhesive agent is difficult to become uniform for each injected portion due to the flow of the injected adhesive agent. As a result, relatively large variations occur in the bonding area of the plate 2 and the bonding area of the upper surface 12 of the optical bench 1 with respect to the adhesive agent layer 3 at each of the plurality of portions formed through the curing of the adhesive agent. In addition, the adhesive agent forms the adhesive agent layer 3 as the adhesive agent cures by being accompanied with shrinkage. If there are thus large variations in the bonding areas of the plate 2 and the upper surface 12 of the optical bench 1 with respect to the adhesive agent layer 3 at the plurality of portions formed through the cure shrinkage of the adhesive agent, even if an attempt is made to position the photodiode 22 with respect to the optical axis P with high accuracy by using the positioning arm 100 described with reference to FIG. 3, a situation can occur in which the photodiode 22 becomes positionally offset from such a positioned point due to the cure shrinkage of the adhesive agent. Hence, there has been a problem in that the positioning accuracy of the photodiode 22 by the use of the positioning arm 100 is impaired by the bonding using the adhesive agent layer 3, which exerts an adverse effect on the reading performance based on the photodiode 22.

This problem similarly has occurred in cases where, as shown in FIG. 4, a plurality of peripheral portions of the plate 2 are bonded to the upper surface 12 of the optical bench 1 in spots by means of the adhesive agent layer 3, or in cases where recesses are formed in a plurality of peripheral portions of the plate 2, and the adhesive agent is injected into the recesses to form the adhesive agent layer.

Further, in the other conventional example (JP-UM-A-61-140126), since the technique of using the adhesive agent instead of the positioning screws is merely proposed in the case of fixing the fixing base to the optical bench, the technique based on this conventional example is not a technique which can overcome the above-described problem that the variations in the bonding areas using the adhesive agent layer impair the positioning accuracy of the photodiode. In addition, with this conventional example, since a method is adopted in which the fixing base is fixed to the optical bench by injecting the adhesive agent into the single hole formed in the fixing base, it is impossible to avoid a situation in which the fixing base is drawn toward the hole side due to the cure shrinkage of the adhesive agent, thereby impairing the initial positioning accuracy.

SUMMARY OF THE INVENTION

It is therefore an object of the invention to provide an optical pickup in which variations are difficult to occur in the bonding areas of the plate and the optical bench with respect to the adhesive agent layer at the plurality of portions despite the fact that the plate and the optical bench are bonded by the adhesive agent layer.

Another object of the invention is to provide an optical pickup for which it is possible to adopt the positioning method in which the photodiode is positioned with respect to the optical axis with high accuracy by effecting the positional adjustment of the plate in the three-axis directions which are perpendicular to each other in the same way as described with reference to FIG. 3, and in which even if the plate and the optical bench are bonded by the adhesive agent layer after such high-accuracy positioning, the initial positioning accuracy is difficult to be impaired.

In order to solve the problems, according to a first aspect of the invention, there is provided an optical pickup including: an optical bench; a plate provided with a photodiode; a plurality of through holes formed at a plurality of portions of the plate with a shape having a border line of a closed circular shape; and adhesive agent layers provided between each of the through holes and a surface of the optical bench that opposes to the through holes, and supports the plate from the optical bench with a minute gap, wherein each of the through holes are formed with a shape and a size that are identical to each other, wherein the minute gap is formed between an upper surface of the optical bench and the plate disposed on an upper portion of the optical bench, wherein the adhesive agent layer is formed by an adhesive agent that is injected from above into the through holes to be forced out downward through the through holes and is cured in a state being reached an upper surface of the optical bench, and wherein each of the adhesive agent layers are formed by injecting a same amount of the adhesive agent to each of the through holes.

According to a second aspect of the invention, there is provided an optical pickup including: an optical bench; a plate provided with a photodiode; a plurality of through holes formed at a plurality of portions of the plate with a shape having a border line of a closed shape; and adhesive agent layers provided between each of the through holes and a surface of the optical bench that opposes to the through holes, and supports the plate from the optical bench with a minute gap.

BRIEF DESCRIPTION OF THE DRAWINGS

The above objects and advantages of the present invention will become more apparent by describing a preferred embodiment thereof in detail with reference to the accompanying drawings, wherein.

DETAILED DESCRIPTION OF THE PREFERRED EMBODIMENTS

Referring now to the accompanying drawings, a description will be given in detail of an optical disk apparatus according to a preferred embodiment of the invention.

Figure 1A:
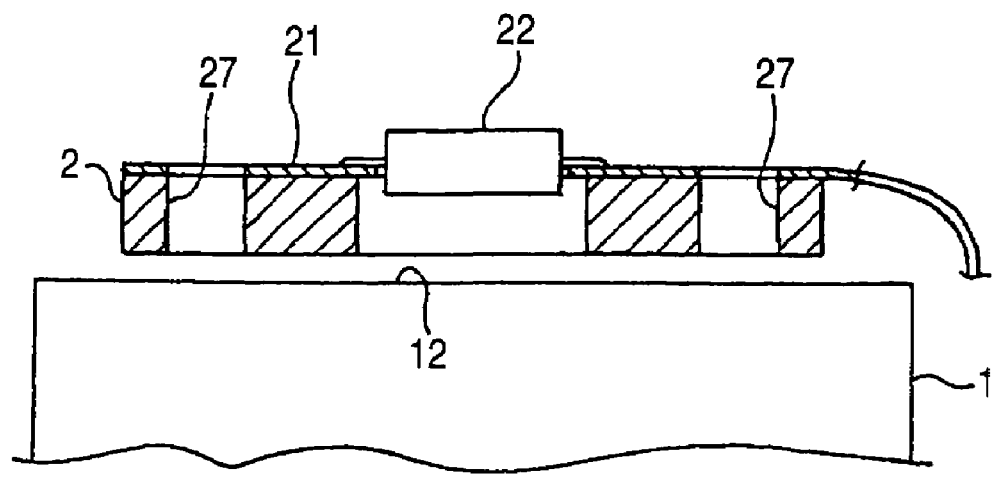
FIG. 1A is a cross-sectional view of essential portions for explaining the assembling process of an optical pickup in accordance with the invention.
Figure 1B:
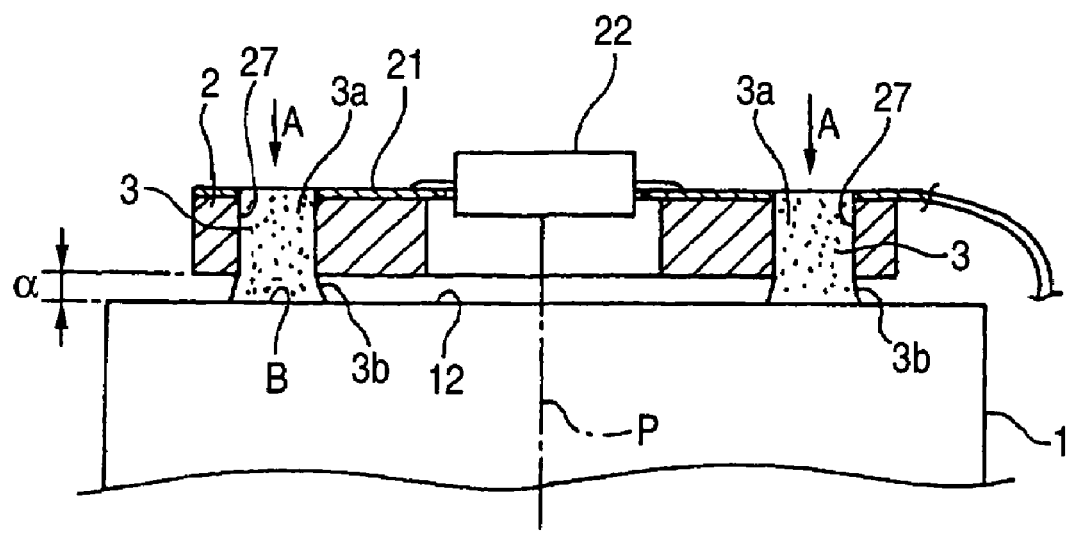
FIG. 1B is a cross-sectional view schematically illustrating the structure of essential portions of the optical pickup.

FIGS. 1A and 1B are cross-sectional views schematically illustrating the assembling process of an optical pickup in accordance with the invention and the structure of essential portions of the optical pickup.

In FIG. 1B, reference numeral 1 denotes an optical bench; 2, a plate; 21, an FPC with a photodiode 22 mounted thereon, the FPC 21 being provided on the plate 2. The plate 2 is disposed on an upper portion of the optical bench 1, and a minute gap α is maintained between an upper surface 12 of the optical bench 1 and the plate 2. Further, the plate 2 has at a plurality of its portions through holes 27 having circular border lines provided with identical shapes and sizes. The plate 2 is bonded to the optical bench 1 through an adhesive agent layer 3 which is formed as an adhesive agent injected from above into the individual through holes 27 in the direction of arrow A is spread out downward (forced out) through the through holes 27 and is cured in the state of having reached the upper surface 12 of the optical bench 1.

Figure 3:
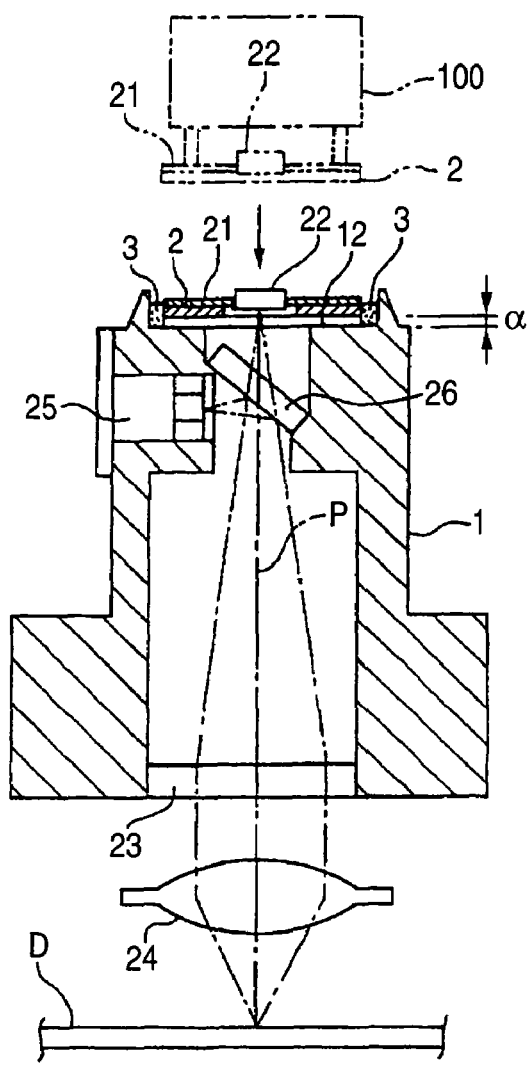
FIG. 3 is a cross-sectional view illustrating the structure of essential portions of an optical pickup as a conventional example.
Figure 4:
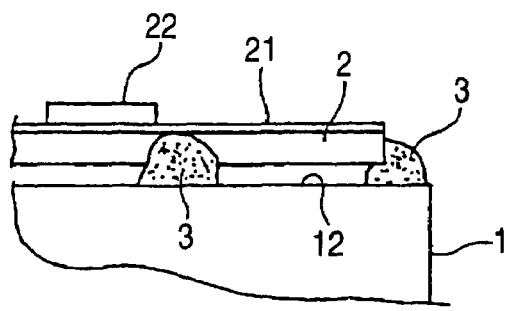
FIG. 4 is a partial cross-sectional view illustrating the structure of essential portions of an optical pickup in accordance with another conventional example.

In the optical pickup having this configuration, the operation of bonding the plate 2 to the optical bench 1 through the adhesive agent layer 3 is performed by the following procedure in substantially the same way as the conventional case described at the beginning. Namely, after the plate 2 is brought close to the optical bench 1 at a predetermined position by using a positioning arm 100 shown by phantom lines in FIG. 3, the photodiode 22 is positioned with respect to an optical axis P with high accuracy by effecting such as the positional adjustment of the plate 2 in three-axis directions which are perpendicular to each other. Through this operation, the plate 2 is disposed on the upper portion of the optical bench 1, as shown in FIG. 1A. After such positioning, the adhesive agent is injected into the through holes 27 at the plurality of portions of the plate 2 and is allowed to cure, as explained with reference to FIG. 1B.

The reason that the minute gap α needs to be formed between the upper surface 12 of the optical bench 1 and the plate 2 is to avoid the interference of the plate 2 with the upper surface 12 of the optical bench 1 at the time of the positional adjustment of the plate 2. For this reason, this minute gap α inevitably becomes an extremely small gap. As a result, by merely providing control such that the amount of the adhesive agent injected into the through hole 27 becomes fixed, the area (bonding area) and the shape of a bonding portion B between the upper surface 12 of the optical bench 1 and the adhesive agent layer 3, which is formed as the adhesive agent injected into the through hole 27 and spread out from the through hole 27 reaches the upper surface 12 and is cured, correspond to the diameter and the shape of the through hole 27, and become uniform for the adhesive agent layer 3 formed by the adhesive agent injected into any through hole 27. In addition, the shape and the size of the bonding portion B correspond to the shape and the diameter of the through hole 27. Further, in the adhesive agent layer 3, the shape and the amount of a portion 3a located inside the through hole 27, as well as the shape and the amount of a portion 3b which traverses the minute gap α, also correspond to the shape and the diameter of the trough hole portion 27, and become uniform for each adhesive agent layer 3.

Accordingly, if the plate 2 is bonded to the upper surface 12 of the optical bench 1 at the plurality of portions through the adhesive agent layer 3 formed by curing the adhesive agent injected into the through holes 27 at the plurality of portions of the plate 2, as shown in FIG. 1B, forces which are generated by the cure shrinkage of the adhesive agent at the respective portions are easily balanced, so that the positional offset of the plate 2 is unlikely to occur. For this reason, after the photodiode 22 is positioned with respect to the optical axis with high accuracy as in FIG. 1A, even if the plate 2 is bonded to the upper surface 12 of the optical bench 1 through the adhesive agent layer 3 as in FIG. 1B, the photodiode 22 remains positioned with respect to the optical axis with high accuracy.

In particular, in this embodiment, the through holes 27 are circular, and the amount of the adhesive agent injected is controlled so as to be fixed; therefore, the bonding area between the adhesive agent layer 3 and the wall surface of the through hole 27 becomes uniform for any through hole 27, and variations are unlikely to occur among the through holes 27. As a result, a situation in which the positioning accuracy of the photodiode 22 is hampered due to cure shrinkage practically does not occur.

In the embodiment described with reference to FIGS. 1A and 1B, the through holes 27 are formed through both the plate 2 and the FPC 21. In this respect, however, through holes 27 may be formed only in the plate 2 at portions where the FPC 21 is not provided.

Figure 2:
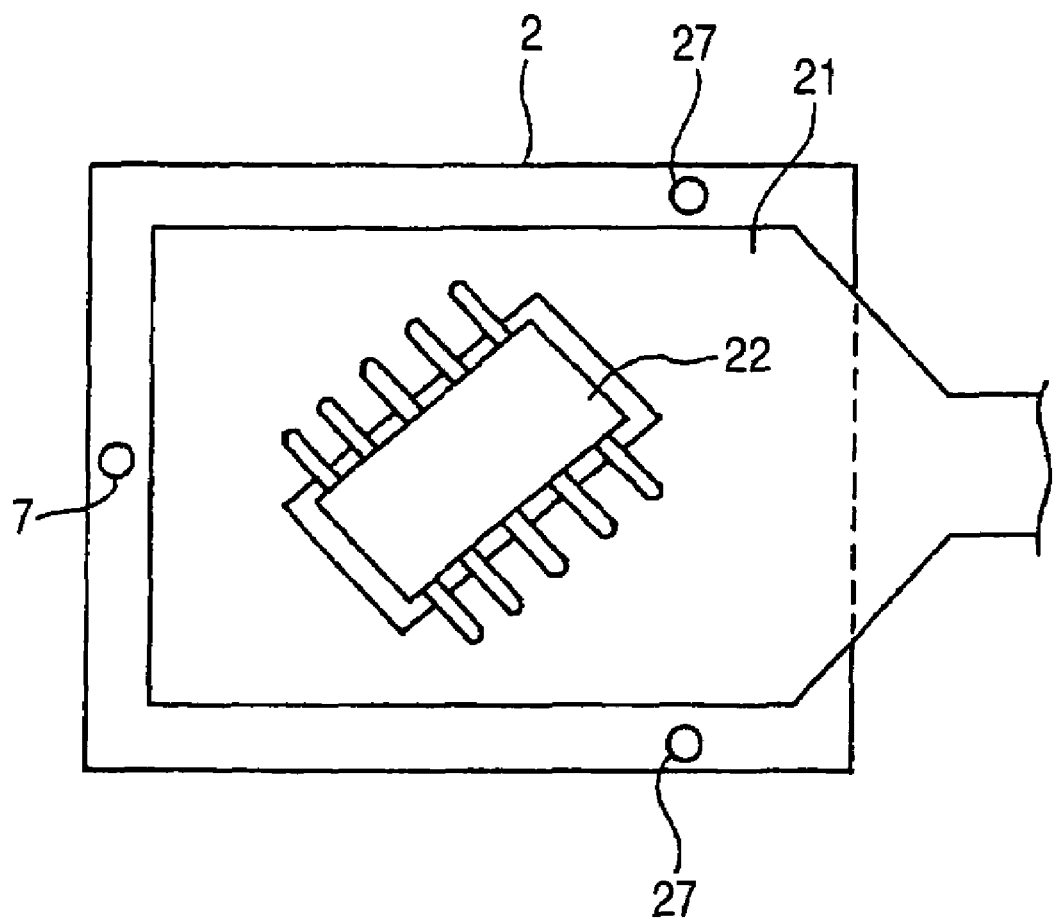
FIG. 2 is an explanatory diagram illustrating a preferred state of layout of through holes in a plate.

FIG. 2 is an explanatory diagram illustrating preferred state of layout of the through holes 27 in the plate 2. In the plate 2 shown in the drawing, the through holes 27 are formed at three portions, and the portions where the through holes 27 are formed are located at the respective apices of an equilateral triangle or a substantially equilateral triangle. If the layout pattern of the through holes 27 is thus arranged, in a case where the adhesive agent injected into the respective through holes 27 undergoes cure shrinkage to form the adhesive agent layer 3 (FIG. 1B), forces which are generated in consequence of the cure shrinkage of the adhesive agent are easily balanced among the aforementioned apices, so that the situation in which the state of initial positioning of the photodiode 22 is hampered practically does not occur. In addition, it becomes possible to firmly bond the plate 2 to the optical bench 1 while minimizing the number of the through holes 27, thereby improving the bonding stability.

Although in the above-described embodiment the border lines of the through holes are circular, the through holes may be angular holes in this respect, or may be formed in the shape of elongated or elliptical holes. In short, it suffices if the border lines of the through holes have closed shapes. Accordingly, recesses such as those which are formed by indenting edges of the plate are not the through holes in the invention.

As described above, in the optical pickup in accordance with the invention, despite the fact that the plate and the optical bench are bonded by the adhesive agent layer, the forces occurring in consequence of the cure shrinkage of the adhesive agent layer are balanced, and the initial positioning accuracy of the photodiode is not impaired and is maintained as it is after the bonding. For this reason, it becomes possible o provide an optical pickup in which the reading performance based on the photodiode is stabilized to a high degree. In addition, in the invention, the plate provided with the photodiode is bonded to the optical bench through the adhesive agent layer in a state in which a minute gap is maintained between the plate and the optical bench. Therefore, it becomes possible to provide an optical pickup for which it is possible to directly adopt the conventional positioning method in which the photodiode is positioned with respect to the optical axis with high accuracy by effecting the positional adjustment of the plate in the three-axis directions which are perpendicular to each other, and in which even if the plate and the optical bench are bonded by the adhesive agent layer after such high-accuracy positioning, the reading performance based on the photodiode is stabilized to a high degree.

As described above, according to the invention, the bonding area between the adhesive agent layer and the surface of the optical bench becomes equal or substantially equal to the area of the opening of the through hole in the plate. Accordingly, the size of the bonding area between the adhesive agent layer and the surface of the optical bench becomes fixed to a size corresponding to the hole diameter of the through hole at each bonded portion, so that variations are difficult to occur in the bonding areas. As a result, the situation is difficult to occur in which the initial positioning accuracy of the photodiode is impaired by the bonding using the adhesive agent layer formed through the cure shrinkage of the adhesive agent.

In the invention, preferably, the border line of the closed shape of each of the through hole is circular. According to this arrangement, variations in the bonding area between the adhesive agent layer and the wall surface of the through hole are difficult to occur at the plurality of bonded portions. As a result, the situation is difficult to occur in which the initial positioning accuracy of the photodiode is impaired by the bonding using the adhesive agent layer owing to the cure shrinkage of the adhesive agent.

In the invention, preferably, the minute gap is formed between an upper surface of the optical bench and the plate disposed on an upper portion of the optical bench, and the adhesive agent layer is formed as an adhesive agent injected from above into the through holes is forced out downward through the through holes and is cured in the state of having reached the upper surface of the optical bench. According to this arrangement, the bonding area between the upper surface of the optical bench and the adhesive agent layer, which is formed by the curing of the adhesive agent which spread out (forced out) from inside each through hole in the plate to the outside, becomes equal or substantially equal to the area of the opening of the through hole. Accordingly, in the same way as described above, variations in the bonding area are difficult to occur, and the situation is difficult to occur in which the positioning accuracy of the photodiode is impaired by the bonding using the adhesive agent layer.

In the invention, preferably, each of the through holes formed at the plurality of portions of the plate has an identical shape and size. According to this arrangement, large bonding strength is obtained since the plate and the optical bench are bonded at the plurality of portions by the adhesive agent layer which is formed in such a manner as to extend between the inner portion of each through hole and a surface portion of the optical bench opposing that through hole. Moreover, since each of the through holes has an identical shape and size, the effects of forces occurring in consequence of the cure shrinkage of the adhesive agent layer at the respective through holes are easily balanced The optical pickup in accordance with the invention is further embodied by a configuration in which an optical pickup in which a plate provided with a photodiode is bonded to an optical bench through an adhesive agent layer in a state in which a minute gap is maintained between the plate and the optical bench, is characterized in that the minute gap is formed between an upper surface of the optical bench and the plate disposed on an upper portion of the optical bench, and through holes each having a circular border line of an identical shape and size are formed at a plurality of portions of the plate, and that the adhesive agent layer is formed in such a manner as to extend between an inner portion of each of the through holes and the upper surface of the optical bench across the minute gap as an adhesive agent injected from above into the through holes is forced out downward through the through holes and is cured in the state of having reached the upper surface of the optical bench, and an amount of the adhesive agent injected with respect to each of the through holes at the plurality of portions is fixed. In addition, according to this configuration, through holes each having a circular border line of an identical shape and size are formed at a plurality of portions of the plate, and the amount of the adhesive agent injected with respect to each of the through holes at the plurality of portions is fixed. Therefore, it becomes possible to further suppress variations in the bonding areas of the plate and the optical bench with respect to the adhesive agent layer, so that the reading performance based on the photodiode is stabilized to a high degree.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. An optical pickup comprising:
an optical bench;
a plate provided with a photodiode;
a plurality of through holes formed at a plurality of portions of the plate with a shape having a border line of a closed circular shape; and
adhesive agent layers provided between each of the through holes and a surface of the optical bench that opposes to the through holes, and supports the plate from the optical bench with a minute gap,
wherein each of the through holes are formed with a shape and a size that are identical to each other,
wherein the minute gap is formed between an upper surface of the optical bench and the plate disposed on an upper portion of the optical bench,
wherein the adhesive agent layer is formed by an adhesive agent that is injected from above into the through holes to be forced out downward through the through holes and is cured in a state of having reached an upper surface of the optical bench,
wherein each of the adhesive agent layers are formed by injecting a same amount of the adhesive agent to each of the through holes, and
wherein there are no supporting elements within the through holes other than the adhesive agent.

2. An optical pickup comprising:
an optical bench;
a plate provided with a photodiode;
a plurality of through holes formed at a plurality of portions of the plate with a shape having a border line of a closed shape; and
adhesive agent layers provided between each of the through holes and a surface of the optical bench that opposes to the through holes, and supports the plate from the optical bench with a minute gap,
wherein there are no supporting elements within the through holes other than the adhesive agent.

3. The optical pickup according to claim 2, wherein the through holes are formed with a shape having a border line of a circular shape.

4. The optical pickup according to claim 2, wherein the minute gap is formed between an upper surface of the optical bench and the plate disposed on an upper portion of the optical bench, and
wherein the adhesive agent layers are formed by an adhesive agent that is injected from above into the through holes to be forced out downward through the through holes and is cured in a state of having reached an upper surface of the optical bench.

5. The optical pickup according to claim 2, wherein each of the through holes are formed with a shape and a size that are identical to each other.

* * * * *